US007734572B2

(12) United States Patent
Wiemeyer et al.

(10) Patent No.: US 7,734,572 B2
(45) Date of Patent: Jun. 8, 2010

(54) BUILDING AUTOMATION SYSTEM CONTROLLER

(75) Inventors: James F. Wiemeyer, Homer Glen, IL (US); Ronald A. Nordin, Naperville, IL (US); Jack D. Tison, Bourbonnais, IL (US); Andrew J. Stroede, Frankfort, IL (US); Timothy M. Nitsch, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 66 days.

(21) Appl. No.: 11/695,784

(22) Filed: Apr. 3, 2007

(65) Prior Publication Data

US 2007/0233323 A1 Oct. 4, 2007

Related U.S. Application Data

(60) Provisional application No. 60/788,896, filed on Apr. 4, 2006.

(51) Int. Cl.
G06F 7/00 (2006.01)
G05B 11/01 (2006.01)

(52) U.S. Cl. ................ 707/103 R; 700/19; 700/275; 707/102

(58) Field of Classification Search .............. 700/19, 700/20, 275–277, 284, 286, 9, 65, 100, 101, 700/102, 103 R, 104.1; 707/100, 101, 102, 707/103 R, 104.1
See application file for complete search history.

(56) References Cited

U.S. PATENT DOCUMENTS

| 5,801,940 | A | * | 9/1998 | Russ et al. ................ 700/276 |
| 5,850,753 | A | | 12/1998 | Varma |
| 5,909,378 | A | * | 6/1999 | De Milleville ............... 700/276 |
| 6,119,125 | A | * | 9/2000 | Gloudeman et al. ..... 707/103 R |
| 6,792,319 | B1 | * | 9/2004 | Bilger ........................ 700/275 |
| 6,972,660 | B1 | | 12/2005 | Montgomery, Jr. |
| 7,136,709 | B2 | * | 11/2006 | Arling et al. .................. 700/20 |
| 7,164,972 | B2 | * | 1/2007 | Imhof et al. .................. 700/20 |
| 7,177,776 | B2 | * | 2/2007 | Whitehead .................. 702/118 |
| 2001/0025349 | A1 | | 9/2001 | Sharood |
| 2002/0047774 | A1 | * | 4/2002 | Christensen et al. ........ 700/275 |
| 2003/0236576 | A1 | * | 12/2003 | Resnick et al. ................ 700/19 |
| 2004/0260407 | A1 | * | 12/2004 | Wimsatt ...................... 700/19 |
| 2005/0033458 | A1 | * | 2/2005 | Brindac et al. ............... 700/19 |

FOREIGN PATENT DOCUMENTS

WO 9960487 11/1999

* cited by examiner

Primary Examiner—Charles R Kasenge
(74) Attorney, Agent, or Firm—Robert A. McCann; Zachary J. Smolinski; Christopher K. Marl

(57) ABSTRACT

A building control system is provided that receives information from devices of different subsystems. A trigger causes a zone controller to store the information in a database. The stored data is used to generate customized reports based on sequences or sets of related events. The information from multiple subsystems is consolidated, analyzed, and patterns of behavior are determined. The trigger also causes execution of control actions throughout the building spanning the multiple subsystems, devices, and areas based on the information. An access control subsystem and a non-access control subsystem of the building control system are linked using a common network such that a change in the state of an access control device can affect the state of a non-access control device and a change in the state of a non-access control device can affect the state of an access control device.

8 Claims, 19 Drawing Sheets

Properties of the Binary Input Object Type

| Property Identifier | Property Datatype | Conformance Code |
|---|---|---|
| Object_Identifier | BACnetObjectIdentifier | R |
| Object_Name | CharacterString | R |
| Object_Type | BACnetObjectType | R |
| Present_Value | BACnetBinaryPV | R[1] |
| Description | CharacterString | O |
| Device_Type | CharacterString | O |
| Status_Flags | BACnetStatusFlags | R |
| Event_State | BACnetEventState | R |
| Reliability | BACnetReliability | O |
| Out_Of_Service | BOOLEAN | R |
| Polarity | BACnetPolarity | R |
| Inactive_Text | CharacterString | O[2] |
| Active_Text | CharacterString | O[2] |
| Change_Of_State_Time | BACnetDateTime | O[3] |
| Change_Of_State_Count | Unsigned | O[3] |
| Time_Of_State_Count_Reset | BACnetDateTime | O[3] |
| Elapsed_Active_Time | Unsigned32 | O[4] |
| Time_Of_Active_Time_Reset | BACnetDateTime | O[4] |
| Time_Delay | Unsigned | O[5] |
| Notification_Class | Unsigned | O[5] |
| Alarm_Value | BACnetBinaryPV | O[5] |
| Event_Enable | BACnetEventTransitionBits | O[5] |
| Acked_Transitions | BACnetEventTransitionBits | O[5] |
| Notify_Type | BACnetNotifyType | O[5] |
| Event_Time_Stamps | BACnetARRAY[3] of BACnetTimeStamp | O[5] |
| Profile_Name | CharacterString | O |

FIG. 2

Properties of the Binary Output Object Type

| Property Identifier | Property Datatype | Conformance Code |
|---|---|---|
| Object_Identifier | BACnetObjectIdentifier | R |
| Object_Name | CharacterString | R |
| Object_Type | BACnetObjectType | R |
| Present_Value | BACnetBinaryPV | W |
| Description | CharacterString | O |
| Device_Type | CharacterString | O |
| Status_Flags | BACnetStatusFlags | R |
| Event_State | BACnetEventState | R |
| Reliability | BACnetReliability | O |
| Out_Of_Service | BOOLEAN | R |
| Polarity | BACnetPolarity | R |
| Inactive_Text | CharacterString | $O^1$ |
| Active_Text | CharacterString | $O^1$ |
| Change_Of_State_Time | BACnetDateTime | $O^2$ |
| Change_Of_State_Count | Unsigned | $O^2$ |
| Time_Of_State_Count_Reset | BACnetDateTime | $O^2$ |
| Elapsed_Active_Time | Unsigned32 | $O^3$ |
| Time_Of_Active_Time_Reset | BACnetDateTime | $O^3$ |
| Minimum_Off_Time | Unsigned32 | O |
| Minimum_On_Time | Unsigned32 | O |
| Priority_Array | BACnetPriorityArray | R |
| Relinquish_Default | BACnetBinaryPV | R |
| Time_Delay | Unsigned | $O^4$ |
| Notification_Class | Unsigned | $O^4$ |
| Feedback_Value | BACnetBinaryPV | $O^4$ |
| Event_Enable | BACnetEventTransitionBits | $O^4$ |
| Acked_Transitions | BACnetEventTransitionBits | $O^4$ |
| Notify_Type | BACnetNotifyType | $O^4$ |
| Event_Time_Stamps | BACnetARRAY[3] of BACnetTimeStamp | $O^4$ |
| Profile_Name | CharacterString | O |

FIG. 3

Properties of the Command Object Type

| Property Identifier | Property Datatype | Conformance Code |
|---|---|---|
| Object_Identifier | BACnetObjectIdentifier | R |
| Object_Name | CharacterString | R |
| Object_Type | BACnetObjectType | R |
| Description | CharacterString | O |
| Present_Value | Unsigned | W |
| In_Process | BOOLEAN | R |
| All_Writes_Successful | BOOLEAN | R |
| Action | BACnetARRAY[N] of BACnetActionList | R |
| Action_Text | BACnetARRAY[N] of CharacterString | O |
| Profile_Name | CharacterString | O |

FIG. 4

Properties of the File Object Type

| Property Identifier | Property Datatype | Conformance Code |
|---|---|---|
| Object_Identifier | BACnetObjectIdentifier | R |
| Object_Name | CharacterString | R |
| Object_Type | BACnetObjectType | R |
| Description | CharacterString | O |
| File_Type | CharacterString | R |
| File_Size | Unsigned | R¹ |
| Modification_Date | BACnetDateTime | R |
| Archive | BOOLEAN | W |
| Read_Only | BOOLEAN | R |
| File_Access_Method | BACnetFileAccessMethod | R |
| Record_Count | Unsigned | O² |
| Profile_Name | CharacterString | O |

FIG. 5

Power classifications

| Class | Usage | Minimum power levels at output of PSE |
|---|---|---|
| 0 | Default | 15.4 Watts |
| 1 | Optional | 4.0 Watts |
| 2 | Optional | 7.0 Watts |
| 3 | Optional | 15.4 Watts |
| 4 | Reserved for future use | Treat as Class 0 |

NOTE— This is the minimum power at the PSE PI. For maximum power available to PDs, see Table 33–10.

PD power classification

| Class | Usage | Range of maximum power used by the PD |
|---|---|---|
| 0 | Default | 0.44 to 12.95 Watts |
| 1 | Optional | 0.44 to 3.84 Watts |
| 2 | Optional | 3.84 to 6.49 Watts |
| 3 | Optional | 6.49 to 12.95 Watts |
| 4 | Not Allowed | Reserved for Future Use |

FIG. 12

BUILDING AUTOMATION SYSTEM CONTROLLER

CROSS-REFERENCE TO PRIOR APPLICATIONS

This application claims the benefit of priority to U.S. Provisional Application No. 60/788,896, filed Apr. 4, 2006, which is herein incorporated by reference in its entirety.

FIELD OF INVENTION

This invention relates to building automation systems and, more particularly, to building automation systems having computer software-based controllers to monitor and control multiple locations in buildings.

BACKGROUND

Computer software-based controllers are often used in building automation systems to monitor and control building facilities. However, the operation and control of various functions relating to building facilities (such as lighting, HVAC, fire protection, security, utility metering, access control and the like) often are not integrated. Separate and distinct systems are generally utilized to perform such functions within a building. In many instances, these dedicated systems, which are used to perform different building functions, operate in an independent fashion and often do not effectively coordinate information with one another. The history of modification, creation, and communication of software objects, including the binary input objects, binary output objects, file objects, and command objects in existing systems disappears after their use. Even if a "trend log object" has been established to memorize a partial history of an object, this structure lacks the capability to follow sequences of varied system responses to a common trigger.

BRIEF DESCRIPTION OF THE FIGURES

FIG. 2 illustrates an example of a binary input object;

FIG. 3 illustrates an example of a binary output object;

FIG. 4 illustrates an example of a command object;

FIG. 5 illustrates an example of a file object;

FIG. 12 provides examples of power classification tables;

DETAILED DESCRIPTION

A building control system that provides simplified co-operation between building control subsystems is shown and described. Various control actions can be performed throughout a building spanning multiple subsystems, devices, and locations. A building control system that pulls information from multiple subsystems using different protocols is also provided. The building control system stores the information in a database and uses the stored data to generate customized reports based on sequences or sets of related events. The building control system addresses the persistent need to consolidate information from multiple building control subsystems, to analyze the data, and to determine patterns of behavior in a facility.

In particular, as disclosed herein, the building control system is provided with a zone controller that operates as a local area (such as a room or entrance area) controller. The zone controller reads in software objects sent via different protocols (such as Modbus, OPC, BACnet, and LONTalk) from third party building control system devices. The zone controller further processes electrical signals from sensors, actuators, and data ports coupled with various modules of a module assembly for the zone controller. The building control system has the capability to initiate the recording of IP (Internet protocol) video on a video recorder such as a digital video recorder or network video recorder. The zone controller includes a central processing unit and expandable input/output modules to allow for card access, lighting, HVAC control, and other building control functions. The zone controller uses an embedded operating system to house the graphics, configuration, and programming tools. In addition, the zone controller runs a database program used to store point objects associated with the resident area for the zone controller, as well as programs, graphics, pictures, and configuration files and gets its power via a Power Over Ethernet (PoE) connection.

The building control system may comprise a set of devices that automate the behavior of building or facility equipment. The devices, for instance, may be electrically operated devices. The building control system may, for example, comprise the total set of a combination of: HVAC equipment, fire protection equipment, access control equipment, intrusion control equipment, video surveillance equipment, audio intercommunication equipment, lighting equipment, utility metering and delivery equipment, public address equipment, irrigation equipment, or any other devices or equipment. A building control subsystem is a subset of the total building control system, based upon a limited sphere of influence. For example, access control may represent one type of building control subsystem, while lighting may represent another building control subsystem.

Figure 1:
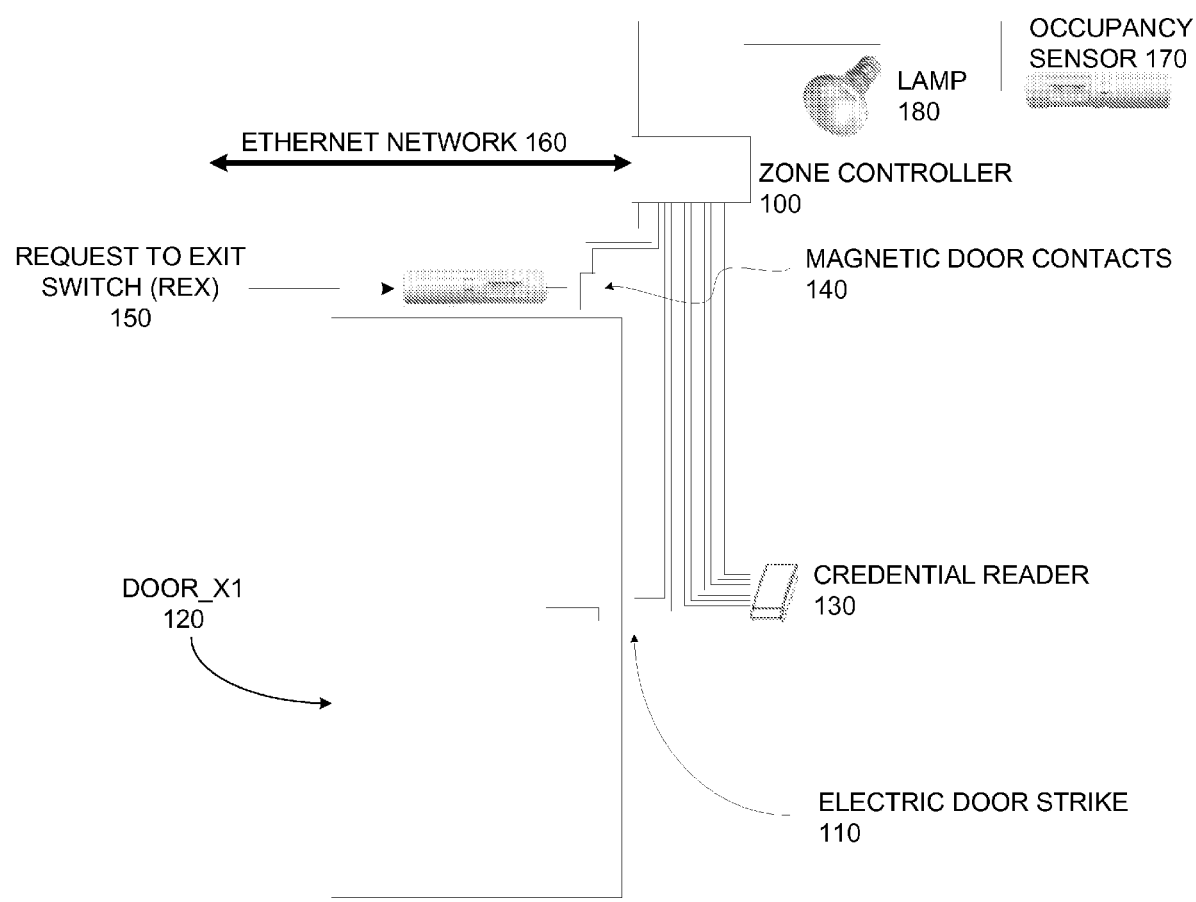
FIG. 1 is a system diagram with a zone controller that monitors and controls actions associated with an area entrance of a building.

Referring to FIG. 1, zone controller 100, associated with an area entrance of a building, is shown. The area entrance of the building in this example is represented as DOOR_X1. The zone controller 100, in the example shown in FIG. 1, communicates with various components associated with DOOR_X1. The zone controller 100 is capable of performing communications via a protocol such as a BACnet protocol. A door strike component 110, for locking and unlocking a door 120, comprising an electric solenoid or motorized lock, for example, is coupled to the zone controller 100 and is positioned near an opening of the door. A credential reader 130 is also coupled to the zone controller 100. Any suitable credential reader may selectively be employed such as a proximity card reader, magnetic stripe reader, biometric reader, and the like. One or more magnetic door contacts 140 used to detect an obstructed door or forced door opening are coupled to the zone controller 100. A request to exit switch 150 (such as a passive infrared occupancy sensor) mounted inside an area entrance, for example, is used to prevent activation of a door alarm when an occupant leaves the area. The zone controller 100 is provided with a communication link 160, part of the building Ethernet network 800, for Ethernet communication to and from remote devices. An occupancy sensor 170 and lamp 180 may also selectively be coupled to and communicate with the zone controller 100 for use in determining if occupants are in the area associated with the zone controller and to control lighting of the area.

As described further herein, zone controller 100 is a computer software-based controller employing various objects for performing actions at a building facility. An object is a data structure used to represent any entity within the field of computer science. For instance, building control system points such as physical sensors, actuators, displays, data ports, and combination devices may selectively be represented electronically as objects. The zone controller 100 is an intelligent electronic controller. The zone controller 100 is adapted to create images of points, comprising information associated with those points, and store the images inside memory as data structures called objects. Objects have identity (a name or identification that distinguishes it from other objects), state (the data currently stored in the object), and behavior (the method by which the objects act or can be used). The objects also have object properties. An object property is any field contained within an object that contains data. Examples of object properties include object identifiers, object names, present value, polarity, local dates, local times, etc. Objects may be classified by object type. An object type is a generic object classification defined by a set of object properties. Examples include binary input object, analog output object, area object, etc.

Referring now to FIGS. 2-5, examples of BACnet objects from ASHRAE standard 135-2004 are provided. In particular, examples of a binary input object 200, FIG. 2, a binary output object 300, FIG. 3, a command object, 400, FIG. 4, and a file object, 500, FIG. 5, are shown. In these examples, each object has a column listing a property identifier 210, property datatype 220, and conformance code 230. These objects offer usefulness for a variety of building automation devices ranging across access control, security, lighting, HVAC, fire protection, utility metering, and other subsystems. BACnet objects facilitate communications and information handling across devices that originate from different manufacturers. These objects provide significant utility within building automation systems. The ability to describe or group triggered threads of multiple events across devices, locations, and subsystems is also beneficial. The ability to identify and describe groups of related objects and occurrences eases: (i) the initiation of coordinated control actions across various building control subsystems; (ii) the recording of coordinated control actions across various building automation systems; (iii) inquiries into system behavior; (iv) troubleshooting; (v) performance optimization; (vi) audit trails; (vii) archiving; (viii) data logging; (ix) system modeling; and (x) economic analyses.

The zone controller 100 utilizes various objects for the monitoring and control of actions occurring at a building area. For example, area objects, subsystem objects, controller objects, and point objects are employed. An area object is an object type that represents a local space within a facility or building, such as a room. The area object may contain properties for area ID, area name, description, longitude, and latitude. Other sets of properties may also be used. The area object ID attaches to a point object as one of the properties of the point object. A point object, as stated earlier, is any object that represents a point. In building automation control, for example, a point may be a physical building control device capable of sensing, actuation, or transporting data. Examples of points may include a space temperature sensor, a card reader, or a video camera. Physical points undergo representation by objects for use within the zone controller software.

A subsystem object is an object type that represents information of the building control subsystem to which a point object has association. For example, a space-temperature point object may have association with a ROOM_X_HVAC subsystem object. Properties of a subsystem object may include system ID, system name, and description. The subsystem object ID also attaches to a point object as one of the properties of a point object. A controller object is an object type that may contain properties for controller ID, name, description, address, and protocol. The controller object ID also attaches to a point object as one of the properties of a point object. The controller object allows a sensor, actuator, HMI (human machine interface—e.g., a device having a display and keyboard) or an object of a combinational device to indicate that it is wired hierarchically underneath an intervening controller, and to indicate the communication protocol of that intervening controller.

Figure 9:
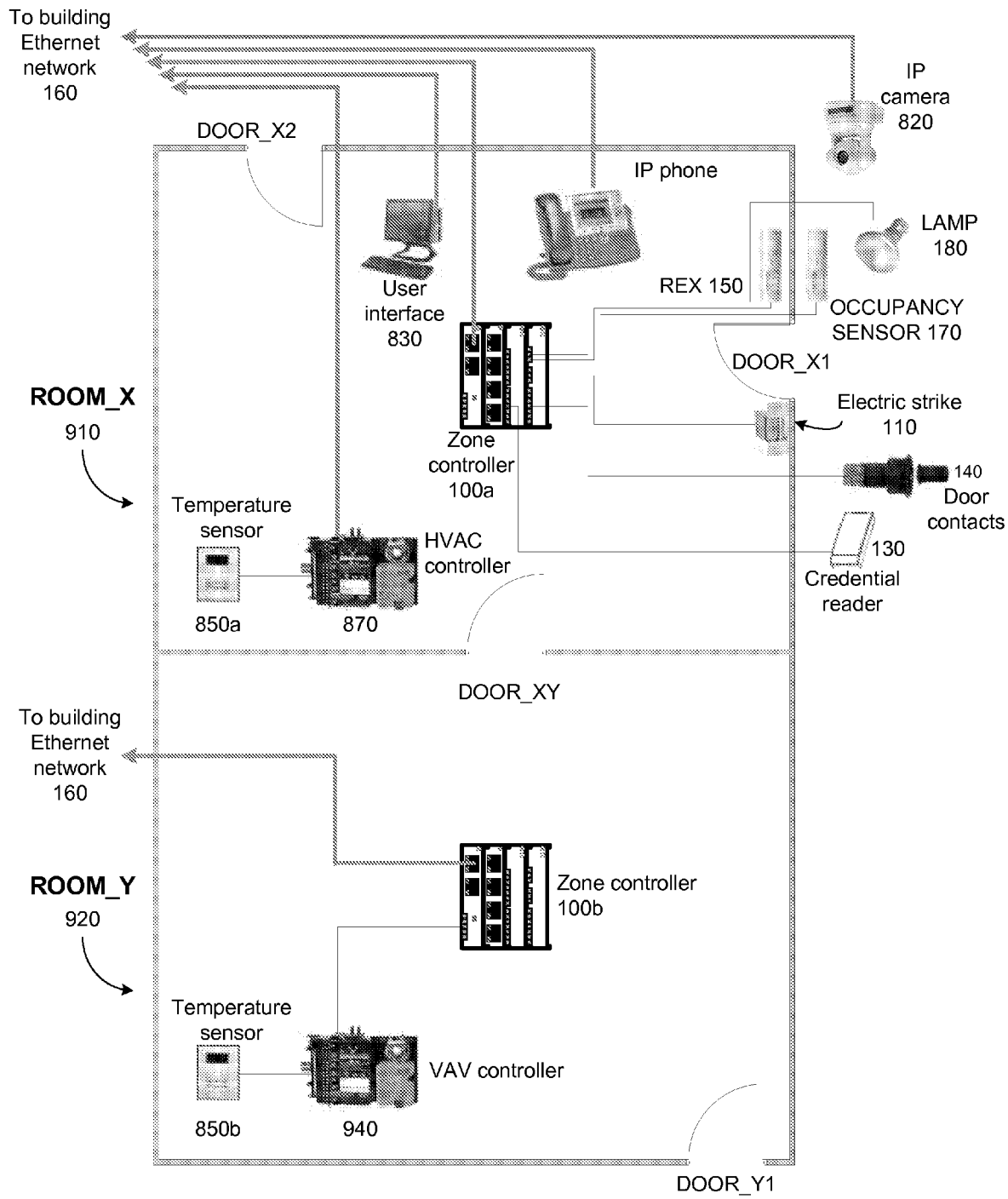
FIG. 9 is a system diagram illustrating exemplary rooms for a building.

In one example, the zone controller 100 may be used to monitor and control a sequence of actions such as activities related to an employee entering a place of employment. Referring to FIGS. 1 and 9, for instance, when an employee approaches a building entrance to a place of employment, at DOOR_X1, an occupancy sensor detects the approaching person, and transfers its relay contacts. The zone controller 100, FIG. 1, measures the switch change at its input port and responds by updating a preconfigured binary input object representing the occupancy sensor 170. The zone controller 100 time/date stamps the binary input object to index its sequence of occurrence. The zone controller 100 updates a preconfigured binary output object, which represents the output connected to its lamp load, and energizes the lamp 180 at the entrance. The zone controller 100 time/date stamps the binary output object. The lamp 180 illuminates an area proximate to the approaching person and the entrance surroundings.

The person entering the area presents an access control credential, such as a proximity card, to the credential reader 130. The credential reader, for example, may be an access control card reader. The zone controller 100 encapsulates the card data into a file object that represents the access control credential and the request to enter the building. The zone controller 100 accordingly time/date stamps the file object. The zone controller 100 then looks up the card identification number within an internal calendar object (schedule), and retrieves "access granted" status for the person (e.g., employee) seeking entry, for the current location, date, and time. A calendar object is an object type that contains a list of dates and times. The calendar object is used to actuate or sense processes at specific dates and times, to record data at specific dates and times, or to exchange information at a data terminal at specific dates and times. For example, the calendar object may designate certain days as holidays in order to modify the behavior of the building control system from its normally scheduled behavior.

The zone controller 100 next updates the binary output object representing the electrically operated door strike component 110 (such as an electric door lock) and unlocks the door 120. The zone controller 100 time/date stamps the binary output object. When the entrant opens the door 120 to enter, the magnetic door contacts 140 transfer to signal the open door state. The zone controller 100 updates a preconfigured binary input object representing the door position being in an open position. The zone controller 100 accordingly time/date stamps the binary input object. The zone controller 100 updates binary output objects representing predetermined lighting fixtures that illuminate the work area for the entrant and the path to the work area. The zone controller 100 then time/date stamps each binary output object.

The zone controller 100a, FIG. 9, creates and distributes a command object to signal "occupied" status to the HVAC controller 870. The zone controller 100a time/date stamps the command object. Although FIG. 9 shows HVAC controller 870 located physically separate from the zone controller 100a, the HVAC controller may selectively be contained within the zone controller 100a, positioned remote from the zone controller, or may be comprised of a number of elements both local and remote. The HVAC system under the operation of the HVAC controller 870 activates to attain the "occupied" temperature set point within the zone associated with the work area of the entrant.

The recording of control action sequences is provided. In particular, a number of steps are performed including: the collection of objects within a building control system; grouping of objects, from the set of all building control system objects into indexed subsets; the grouping of objects based on relevance, relationship, or causal relationship; the aggregation of objects triggered by a predetermined criterion or a logically tested set of occurrences; assignment of a name, label, identification number, address, or equivalent for the subset of objects; and the memorization of the resulting grouped object sequence in an accessible database.

A control action sequence refers to a series of related events caused or implemented by a zone controller. An example control action sequence may be illuminating the lights and warming an area (HVAC on) in response to an occupancy stimulus. Additionally, execution of predetermined sequences of control actions is also accomplished. In doing so, various steps are performed including: the predetermination (i.e. programming into a zone controller), collection and memorization of objects within an automation system; grouping of objects, from the set of all objects, into indexed subsets; the grouping of objects based on a desired, prescribed sequence of automated control actions; assignment of a name, label, identification number, address, or equivalent for the sequence (or subset); and execution of the control action sequence in response to a logical trigger criterion. A logical trigger criterion may be defined as a logically tested set of occurrences and object property values.

Figure 6:
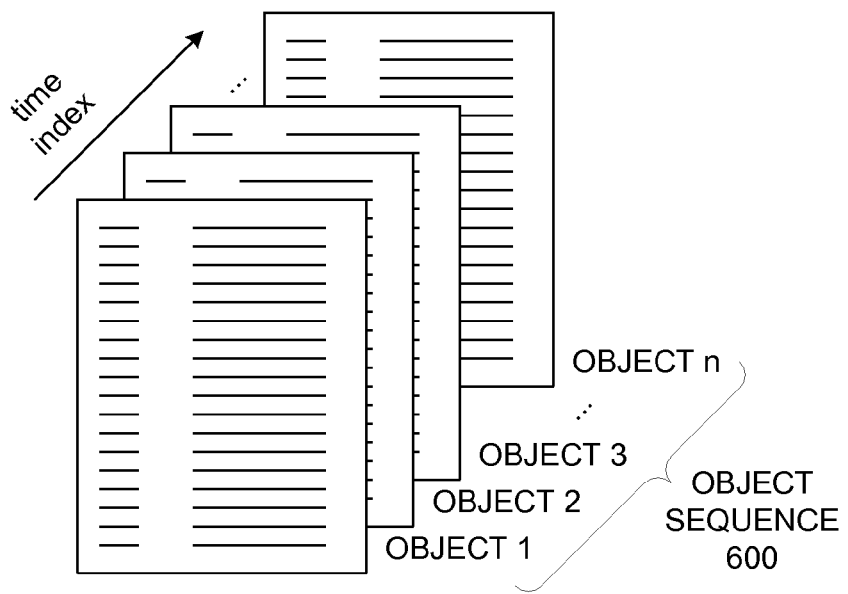
FIG. 6 illustrates an example of a data structure with an object sequence of different objects.
Figure 7:
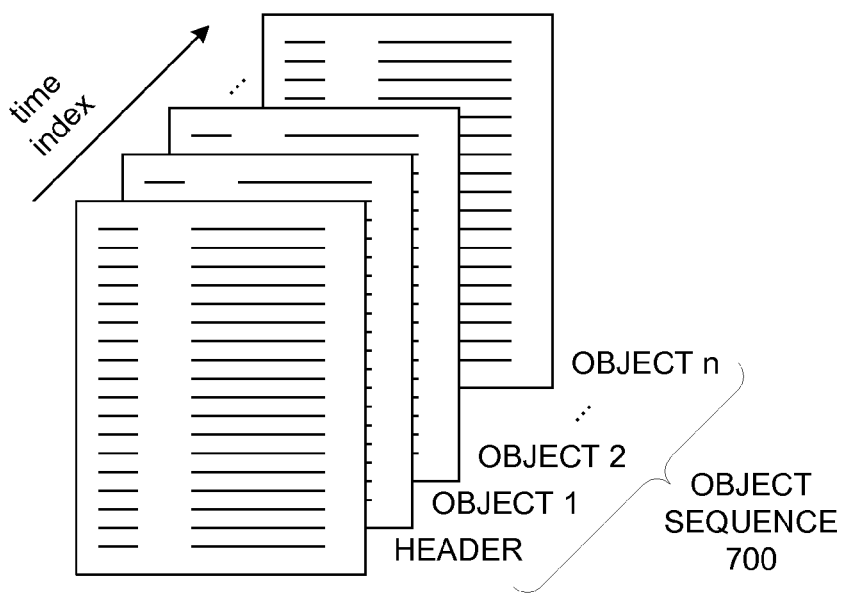
FIG. 7 illustrates another example of a data structure with an object sequence of different objects.

Referring now to FIGS. 6 and 7, diagrams of data structures that represent recorded or executed control actions are shown. Each has a designation as an object sequence 600 (FIG. 6), 700 (FIG. 7). An object sequence may, for example, be a group of objects that are indexed by time or by another object property. The object sequence includes a collection of different elemental objects, such as those shown in FIGS. 2-5. An elemental object is a singular object, as contrasted with an object sequence or collection of objects. In the example described above with reference to FIG. 1, two related sequences, triggered respectively by the occupancy sensor 170 and credential reader 130 stimuli, influence the resulting system behavior. The time and date stamp may be used to order or index the collection of objects in memory, but other object properties may also selectively perform this role. If a single object analogously resembles a page of information, the object sequence then represents a booklet of information as illustrated in FIGS. 6 and 7. The algorithm to generate an object sequence might appear simply as follows: IF (CARD READ) THEN (CREATE OBJECT SEQUENCE=NEXT 10 EVENTS). In the preceding algorithm, the term, "event" could refer to a change to any object contained within the zone controller.

Object sequences may include two copies of each elemental object, to show the content of each object before and after modification by the zone controller 100. This preserves useful information, since changes to objects become easier to identify and quantify. Each stimulus of the zone controller 100, FIG. 1, which satisfies an object sequence trigger criterion causes execution of a predetermined sequence of control action or memorization of the sequence of modifications to each object undertaken, or both.

Control actions may be recorded using a pre-trigger object buffer. The zone controller records control actions into a buffer located within its electronic memory, or within the building control system network database server, using a predetermined number of pre-trigger objects. Incorporation of several objects into the buffer, for example, in association with an area entrance as described with reference to FIG. 1, would allow card presentation at credential reader 130 to trigger grouping of the object sequence; and enable the zone controller 100 to record the entire sequence of resulting or related system actions, including the handling of the occupancy sensor 170 and the entry lamp 180 earlier in time.

Logical expressions may also be employed as triggers. Logical combinations of objects are used to trigger either memorization of actual transpired object sequences or initiation of prescribed control action object sequences. For example, consider the act of forced entry by "jimmying" a door open with a pry bar. The zone controller 100, FIG. 1, detects the transition of the magnetic door contact at the entrance from a "door closed" to a "door open" state. The zone controller 100, however, has prescribed the door into the "locked" state. The combination of the binary output object representing the current prescription for "door locked" and the binary input object representing the current open position of the door will programmatically satisfy a predetermined Boolean logic requirement to generate an alarm. Grouping and recording of objects into an object sequence structure will also be triggered. An open door, however, in and of itself, may not necessarily trigger the grouping and recording of an object sequence. A building supervisor for example, may not care if an occupant has normally exited the building, or if an entrant has provided an acceptable credential such as an access card. In these cases, the zone controller 100, FIG. 1, will have prescribed the "unlocked door" state. The logical combination of ad hoc criteria permits arbitrary designation of various object sequence triggers. This capability allows the building control system to function according to the need or preference of the appropriate authority having jurisdiction for the building.

Any number of elemental objects may provide inputs to a logical or mathematical criterion to trigger the generation of an object sequence. For instance, any number or manner of logical, numeric, arithmetic, or mathematical operators may be applied to system data in order to evaluate and satisfy a predetermined trigger criterion. In other words, several inputs, outputs, and variables may selectively undergo mathematical processing with well known, familiar operators such as $<, >, =$, AND, OR, IF, $+, -, \times, \div$, timer values, and the like. Non-object values also may be used to trigger the generation of object sequences. One example may include an input to a zone controller that has no representation as a BACnet object. Thus, activation of a proprietary tamper switch on an equipment enclosure, even if unrepresented by an object, for example, may trigger an object sequence. The result of an arbitrary internal calculation within the zone controller 100, FIG. 1, is but one of many other possible examples of non-object triggers.

Figure 8:
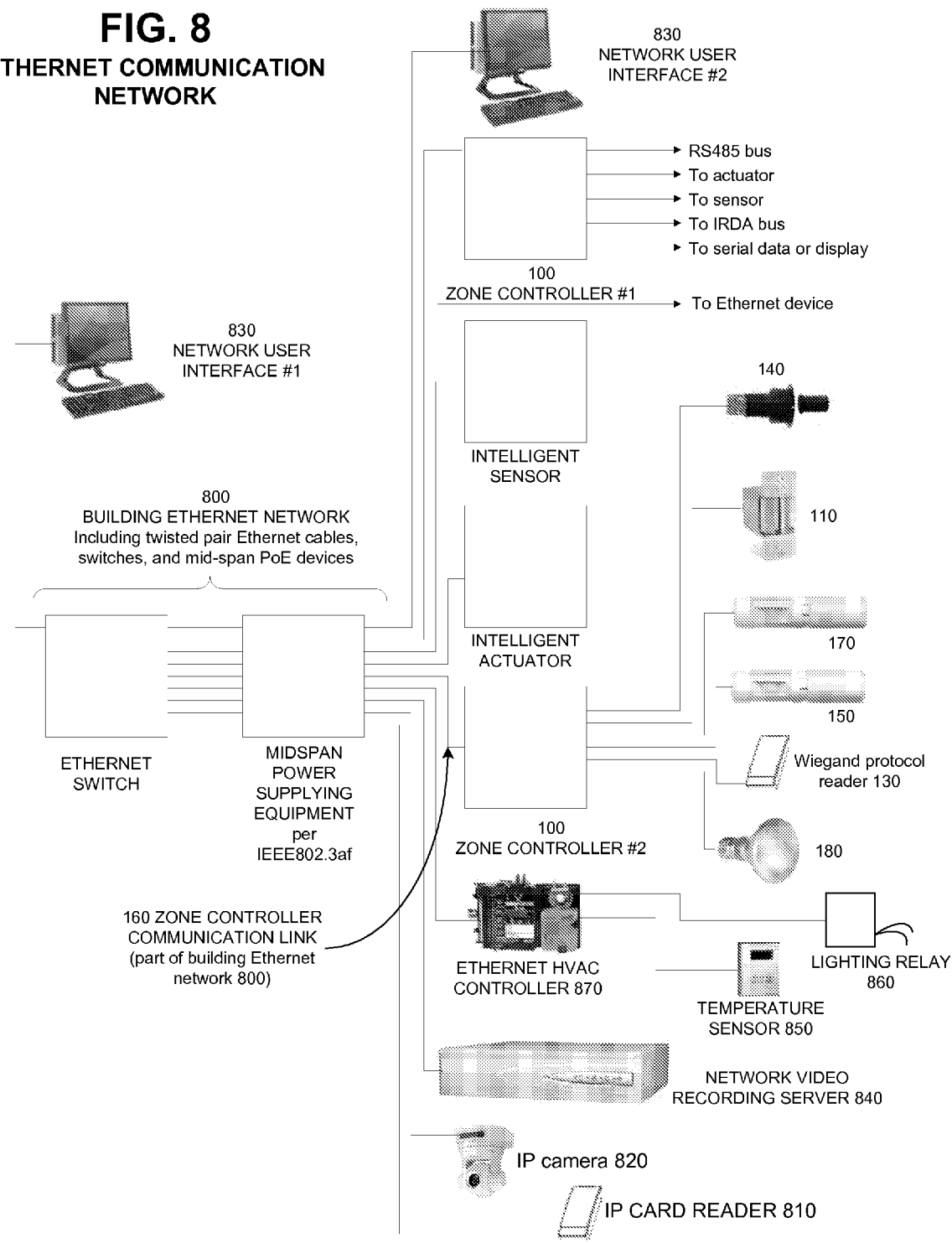
FIG. 8 is a system diagram illustrating a zone controller in communication with remote networked devices.

In cases where the zone controller 100, FIG. 8, interacts with other equipment residing remotely on the network, initiating predetermined control action sequences involves communicating the prescribed sequence of objects to the distributed system hardware. Ethernet communication may be used for such networked communications. Recording actual indexed object sequences of implemented control actions may include a greater quantity of information than initiating control object sequences. This is because distributed controllers may in themselves contain control object sequences triggered by a singular communication from a remote initiating device; and control actions may depend upon conditional criteria, such as the local temperature, light level, smoke level, $CO_2$ level, wind direction, or the like. Therefore, threads of actual control actions slated for recording, especially those involving remote networked equipment, generally include more information than a single prescribed execution sequence within a single zone controller.

As seen in FIG. 8, zone controller 100 is coupled for communication with remotely located devices. Zone controller 100 communicates over the building Ethernet network 800. For example, Internet protocol-based devices such as IP card reader 810 or IP video camera 820 communicate with zone controller 100 using an Ethernet communication platform. Remotely located network devices, such as a network user interface 830, network video recording server 840, or Ethernet HVAC controller 870 communicate with the zone controller 100 through the Ethernet network associated with the building. Other remote devices such as temperature sensor devices 850 or lighting relays 860 communicate directly with or underneath Ethernet capable control devices like HVAC controller 870. The HVAC controller 870 represents temperature sensor devices 850 and lighting relays 860 with objects and renders them accessible to the zone controller 100 via the building Ethernet network. Additionally, as seen in the example of FIG. 8, other devices may further communicate with zone controller 100 apart from the Ethernet network associated with the building. For example, card reader 130, electrically actuated locking door strike 110, request to exit device 150, and door contact 140 are coupled and in communication with zone controller 100 via various modules of a module assembly (including processor module 1300, FIG. 13) of the zone controller. An intelligent sensor, FIG. 8, may act as an input device and an intelligent actuator may be provided as an output device. More than one zone controller may be provided, as seen in FIG. 8, with Ethernet being the information conduit for zone controller communication. The building Ethernet network 800 may include an Ethernet switch and power supplying equipment coupled to the zone controller 100 over zone controller communication link 160.

The building control system may have the capability to collect all information relevant to grouping diverse elemental objects into indexed or ordered object sequences. The object sequence structures may include elemental objects that originate from a number of networked building control system devices. The building control system, of FIG. 8, with devices distributed on a communication network, has the capability to record distributed, transpired object sequence details. This follows since the zone controller can order and memorize object sequences. With the information resident in distributed, networked zone controllers, the following actions complete the recording of the full thread of a control sequence: (i) retrieval of recorded object sequences; (ii) concatenation or linking of the targeted object sequences into a single object sequence, and (iii) memorization within a single database.

These actions may be completed by the initiating controller, by a second zone controller or by a networked database server programmed to mine these threads of related sequences. The retrieval of such information may also be undertaken during normal, periodic heartbeat communications to a building network user interface 830 residing on the network.

In another example embodiment, area objects, system objects, and controller objects may be associated with point objects. This aspect of the zone controller involves logical grouping of point objects according to the physical areas in which they reside. A point object again is an object that represents a sensor, actuator, or data port. The various point objects can also form groups based on the subsystems and controllers to which the objects have association. Point objects, for example, can undergo logical association with more than one area object, subsystem object, and controller object, in order to simplify integration. One example of a point object residing in two areas may include an object type, "door with access control", representing a physical door set that separates two rooms, such as DOOR_XY in FIG. 9. HVAC, lighting, utility metering, fire protection, and other common building control subsystem elements may provide other examples of point objects logically associated with multiple area objects as well, if those physical systems serve a large enough space.

FIG. 9 is a graphical representation of the spatial layout of a facility and its control equipment. FIG. 9 shows a system diagram illustrating exemplary rooms (ROOM_X 910, ROOM_Y 920) of a building. ROOM_X 910 is represented as an area object. Further, ROOM_X 910 physically contains multiple sensors, actuators, and data ports including in part: a card reader 130 hardwired into the zone controller 100 (as a data port); an HVAC controller 870 using BACnet IP (actuator), and a temperature sensor 850 hard wired into the HVAC controller 870.

Figure 10A:
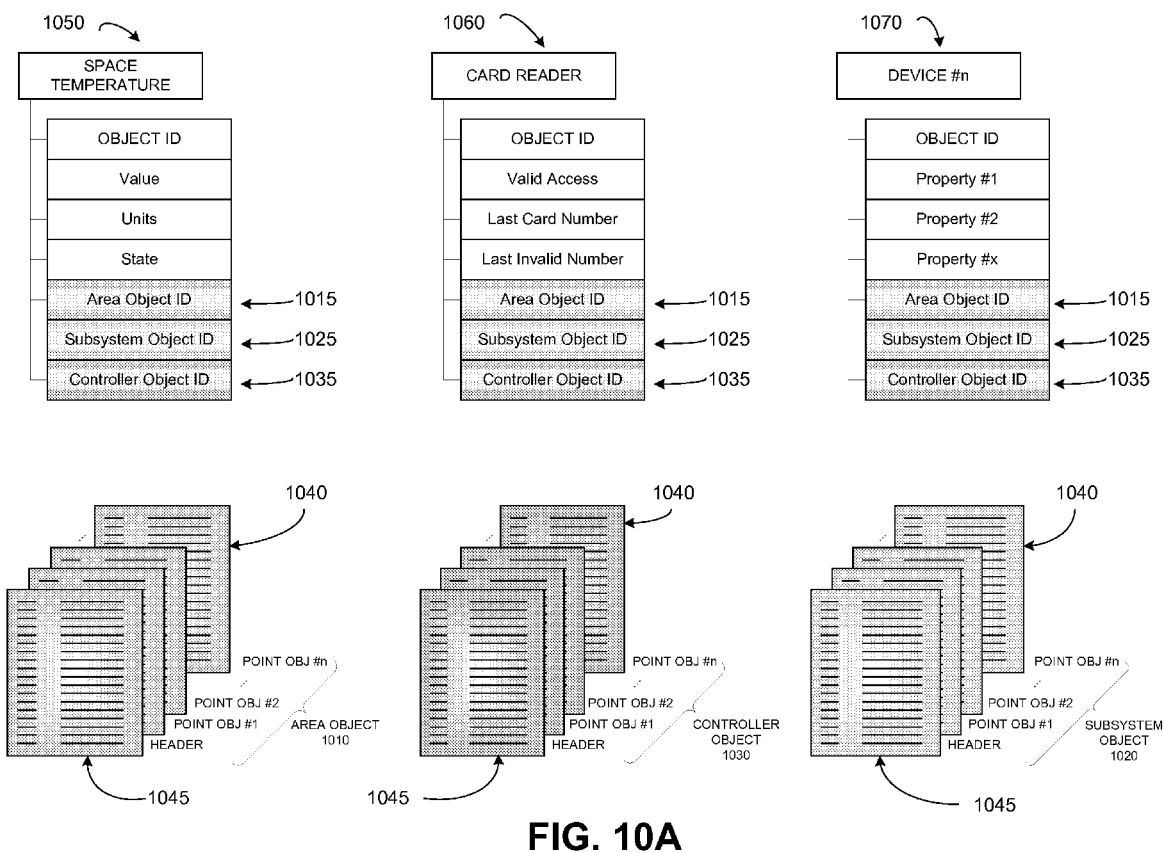
FIG. 10A illustrates an example of an area object, subsystem object and controller object.

In the embodiment of FIG. 10A, an area object 1010, subsystem object 1020, and controller object 1030 are shown. The collection of area, subsystem, and controller objects 1010, 1020, 1030, respectively, is provided by the set of point objects 1040 representing the physical devices associated with each of them. Exemplary point objects for space temperature 1050, card reader 1060, and generically a device (#n) 1070 are also shown. The temperature object 1050, card reader object 1060, and device #n object 1070 (all point objects) each include properties that identify the areas (e.g. area object id 1015), subsystems (e.g. subsystem object id 1025), and controllers (e.g. controller object id 1035) with which they have association. A header page 1045 contains bookkeeping data, or properties, such as record length or number of constituent point objects, identification, name, description, and area longitude and latitude information. The longitude and latitude data facilitate GPS (global positioning system) location of equipment. Any manner of additional information may appear in the header. In this embodiment, point objects reappear inside each area object 1010, system object 1020, and controller object 1030 with which they are associated. This embodiment may utilize significant zone controller memory space.

Figure 10B:
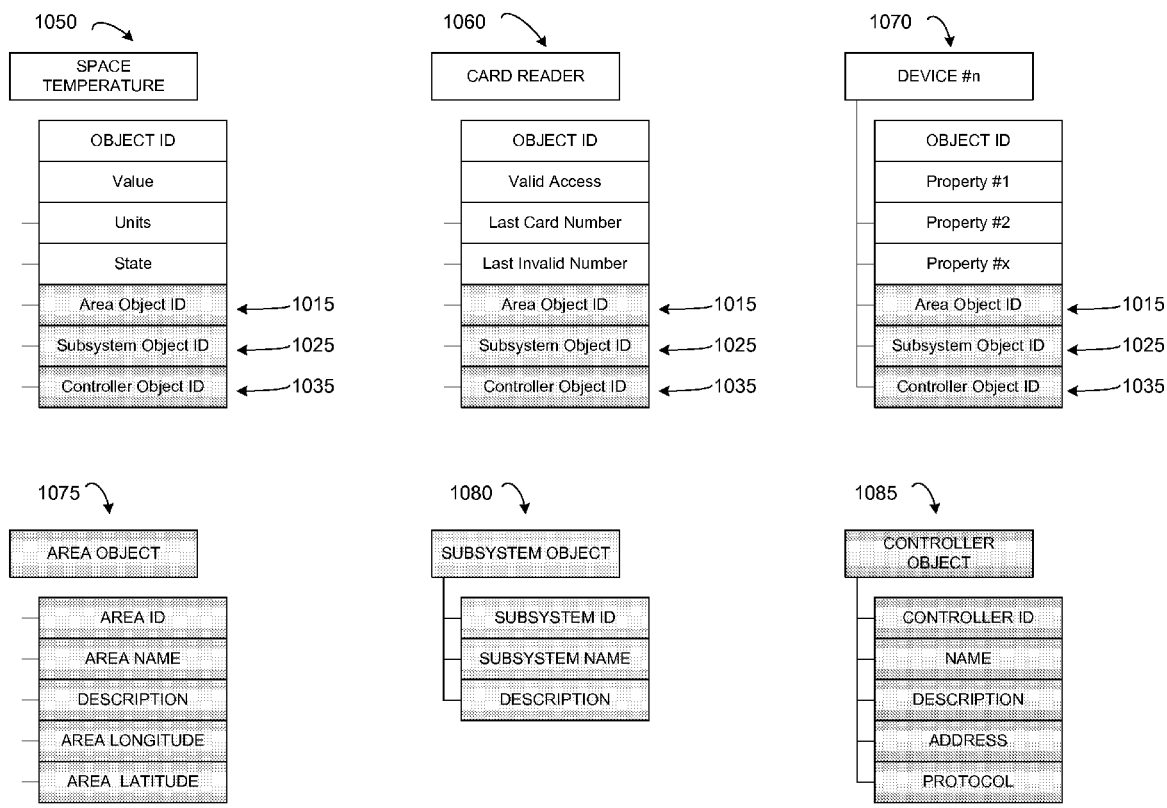
FIG. 10B illustrates another example of an area object, subsystem object and controller object.

In an alternative embodiment, shown in FIG. 10B, collections of elemental area objects 1075, subsystem objects 1080, and controller objects 1085 stand alone. The objects 1075, 1080, 1085 represent specific areas, subsystems, and controllers, and have no constituent point objects contained within them. The information associating the area, subsystem, and controller to each point object already appears in the dedicated property slots 1015, 1025, 1035 within each point object. This approach obviates formation of redundant collections of point objects within the large data structures representing areas, subsystems, and controllers as described in the example in FIG. 10A. Each area object, subsystem object, and controller object may be associated with an unlimited number of point objects. Each point object may be associated with an unlimited number of area, subsystem, and controller objects as well.

Configuration of objects is performed by a user. The user defines each area object, subsystem object, and controller object, and then attaches each to specific point objects in the database associated with a zone controller 100. A zone controller 100a, FIG. 9, for a room area recognizes these properties in each point object. The space temperature sensor object representing temperature sensor 850a, for example, may have association with the HVAC controller object representing HVAC controller 870; the temperature sensor object may also have association with an HVAC subsystem. The user may create an area object, subsystem object, controller object, or point object by using web page tools contained within the zone controller 100. The area identified as ROOM_X 910, in FIG. 9, for example, may associate with specific point objects representing equipment physically located in ROOM_X.

Figure 11:
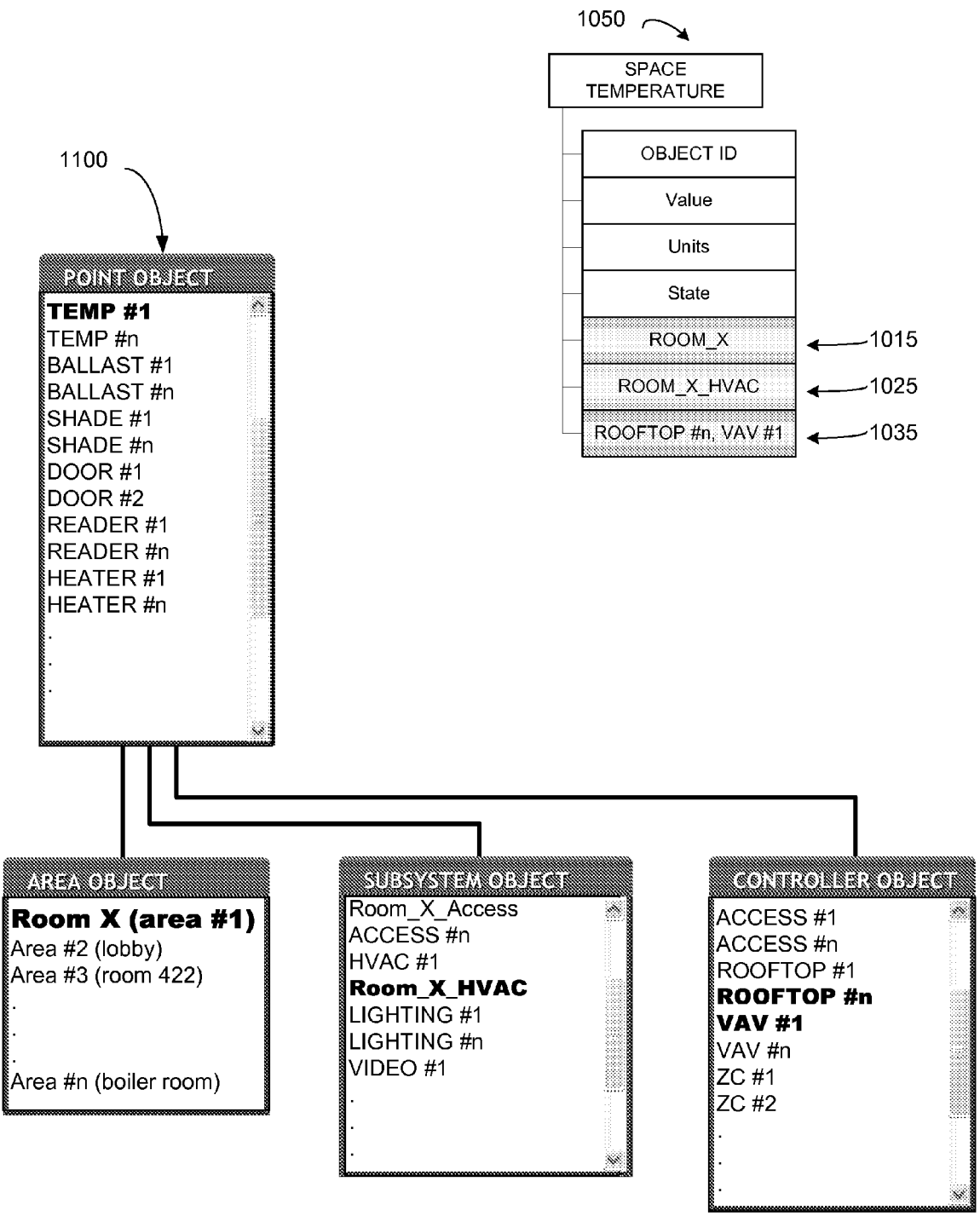
FIG. 11 illustrates an example of a database configuration with point objects associated with area objects, system objects and controller objects.

Referring to FIG. 11, a database configuration tool provides each point object 1100 with columns for association with area objects, subsystem objects, and controller objects. For example, the temperature sensor contains Room X as an object property to represent where the actual temperature sensor physically resides. Its object also contains a subsystem property identifying "Room_X_HVAC" to which it has logical attachment.

By monitoring and controlling actions within areas of a building through employment of the zone controller, various reports can be created. For example, the zone controller 100a, FIG. 9, may communicate with the temperature sensor 850a through the BACnet HVAC box controller 870, and duplicate a representative object for the temperature sensor (as well as for other objects) in the database for a local zone controller. The zone controller 100a can also create point objects at the local database to represent hardwired card readers, door strikes, or any other physical device. Each point object contains a unique identifier stored within the database for the zone controller to ease device inventory and targeting of messages at intended recipients.

The zone controllers 100a and 100b, FIG. 9, may synchronize object statuses associated with points, areas, subsystems, and controllers during periodic heartbeat communications with an enterprise database. The "enterprise database" may be embodied as a software program, preferably stored at a personal computer (PC) such as user interface 830 that views the building control system over a network, serves as a human interface, mines and archives data as desired, and generates reports upon request. The software of the enterprise database queries the databases of the zone controllers associated with the relevant points; returns values, alarms, and events, as needed; and presents the information in a predefined report structure by correlating or otherwise ordering the data associated with the object properties. The enterprise database allows users to generate a system report, for example, with the values contained within all point objects associated with a predefined system over a specific time interval.

The reports can also be customized and may accumulate and include the occurrences in an area over a specified time interval. In this example, the user enters an area ID, a beginning time, and an end time to generate the report. The reports can also generate or recall object sequences using any of the other logical trigger criteria and indices as described above. Another example of a sequence report may involve an "audit trail" which provides for retrieval of all transactions of a specific access card, associated with a specific person, on a specific date or date range. A further example of a sequence report may include retrieval of all access cards currently inside a building, which may be useful for emergency evacuation requirements. This example can provide information indicative of occupants still inside a building, requiring evacuation from a fire.

The zone controller supports data logging to provide trend log objects. The zone controller 100 can log any property value of any point object as defined by the user. Each log datum entry has an associated time/date stamp to indicate the period for which the log was taken. A user may selectively configure alarms for each point object if the point property value falls outside a predetermined range. In the event of an alarm, the area, subsystem, point identifier and value from each point object associated with the area object are written locally in a zone-controller-event-table of the zone controller database, and all assigned the same alarm identifier. Logs and alarms are stored for a predefined interval. After the predefined interval has expired, the alarms can be archived in a central database located on a file server (network database server).

The zone controller 100 reads software objects using multiple protocols such as BACnet, Modbus, OPC, LONTalk, Johnson Controls N2, and others. A user manually programs or configures each point object. Alternatively, a networked "find" request (if available from the open protocol) causes all zone controllers to report all of the available objects and attributes. A localized database, residing in the zone controller 100, FIG. 8, stores all point objects and configurations.

In addition to the local configuration of the zone controller, an enterprise software program suite resident in the network user interface PC 830 allows for configuration of multiple zone controllers over the Ethernet communication path or backbone. The enterprise software allows users to relate point objects resident in multiple zone controllers into a single, common building control system. For example, a number of different zone controllers may monitor and control the chilled water subsystem of a building. The enterprise software views all of the information concerning the chilled water subsystem. The enterprise software provides for the generation of custom reports that show how such an area or subsystem reacted to a specific occurrence. The reports contain information collected from recorded system object sequences as described above.

Users have the ability to define rules, carried out in the event an alarm occurs. For example, in the event a door contact 140, FIG. 1, of a controlled door 120 reads 'open' when there has not been a valid card read, the zone controller would generate an alarm indicating a forced open door. This alarm processing can be linked to an IP camera 820, FIG. 8, at the room that is prompted to spin to the location of the door. The IP camera 820 may then send a video stream to a networked video storage system (not shown), with a corresponding alarm message to simplify searching. The zone controller 100, for example, may send a lock down signal to all the doors associated with the area and notify all cameras associated with the area to begin recording. These prescribed control actions reside within an object sequence and undergo triggering by tested criteria as described earlier.

The zone controller 100 allows for cooperation with a number of modules of a system controller module assembly and their associated i/o as seen in FIGS. 13-27. This flexibility results in a variable expected power demand, dependent upon the number and nature of connected modules. The change in required operating power may result in overloading the supply of delivered power upon installation of additional modules, or after connection of additional loads to existing connected modules.

In order to manage power, the zone controller 100 recognizes the various modules that it is connected to, knows the required power draw of each module, sums the individual demands, and arrives at the total required power. As modules are added or subtracted, the zone controller then adapts its power consumption class in accordance with the true demand of the connected modules for operating power. The tables of FIG. 12, excerpted from IEEE 802.3af-2003, show classifications for powered devices, which applies to the zone controller with connected loads in this example. The zone controller 100 has the capability to recognize its downstream modules, tally their power demands, and sum the demands to request the smallest possible maximum power delivery. The zone controller further determines the discrete actuator and sensor load sum for each module. In other words, in a zone controller with eight digital output ports, the load current draw for each output could be determined by typing configuration data into controller memory. To accommodate this, each input and output is represented by an object within the zone controller main processor module. Each object then contains property fields for voltage and current, which can be assigned values by configuration by the standard browser software for the user. A microprocessor calculates the total required power as the sum of all voltage-current products from its input and output objects. Alternatively, the zone controller 100 measures the current drawn from its loads during system commissioning. The zone controller subsequently tallies the total power demand to select the correct powered device (PD) power classification for communication to the power supplying equipment (PSE). The dynamic PD classification scheme described accurately reports power demand to PSEs, improves the reliability of the power management system, and requests only the quantity of power actually required. This, in turn, provides the PSE equipment with a realistic power demand. Additionally, PSE devices may automatically shut down loads that demand more power than the supply can deliver reliably. The zone controller 100 is further able to characterize its loads in terms of not only the required operating current, but also by the required operating voltage of the loads. Thus, the zone controller (PD) can accept the standard −48VDC from the PSE, and forward any arbitrary voltage to the downstream module. This is beneficial since building control systems commonly utilize components requiring 5VDC, 9VDC, 12VDC, 24VDC, and so on.

Referring now to FIGS. 13-27, a physical form of an example Ethernet-based zone controller is shown. The physical format of the zone controller in this example comprises a modular construction with a processor module 1300 coupled with various additional modules housed as part of a module assembly 2700 (e.g. as seen in FIG. 27) for the zone controller. These additional i/o modules allow application-specific configuration, nomenclature, and functions.

Figure 13:
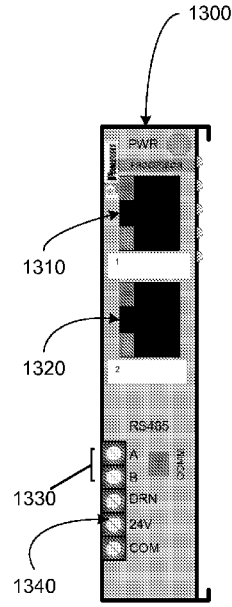
FIG. 13 is a front view of a processor module of an exemplary module assembly for a zone controller.

In FIG. 13, processor module 1300 is shown. The processor module 1300 is provided with a real-time clock. In this example, processor module 1300 has two 10/100 Mbps Ethernet port connections 1310, 1320, one RS-485 connection 1330, and a 24VAC/DC power connection 1340. The processor module 1300 is also power-over-Ethernet (PoE) enabled. The processor module 1300 may use an embedded operating system, for example, eLinux or WindowsCE.net. The processor module 1300 communicates with additional attached modules (e.g. modules seen in FIGS. 14-25) by serial interface, such as I²C, a common serial bus within embedded microelectronics. In this example, the processor module 1300 provides the functionality to: host web based scalable vector graphics (SVG); host web-based programming and configuration; store and execute local programming sequences; store access control records; provide web-based reporting capabilities; send out simple network management protocol (SNMP) messages to network management software; and send and receive BACnet IP, Modbus IP, and LONTalk IP packets.

Figure 14:
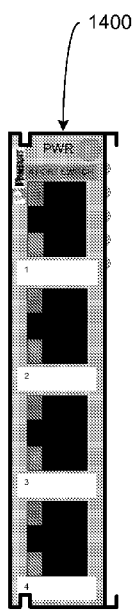
FIG. 14 is a front view of a four port switch module of an exemplary module assembly for a zone controller.
Figure 15:
FIG. 15 is a front view of a memory expansion module of an exemplary module assembly for a zone controller.

Switch module 1400 is shown in FIG. 14. The switch module 1400, in this example, is a four-port switch module. Referring to FIG. 8, the switch module 1400 may be a local 10/100 Mbps, 4-port switch to connect monitor stations, IP cameras, IP-based building automation system equipment, and the like to a local area network 800. The switch module 1400, FIG. 14, may be designed to share high bandwidth information with the Ethernet, but only low bandwidth information with the processor module 1300 of the zone controller 100. A memory expansion module 1500 is shown in FIG. 15. The memory expansion module 1500 is used to expand the local storage of the processor module 1300, FIG. 13. Applications at the memory expansion module 1500 may include storage of graphics files, personnel records and customized applications. Multiple memory expansion modules can be connected based on the needs of an application.

Figure 16:
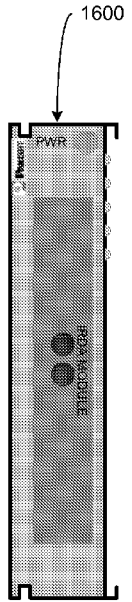
FIG. 16 is a front view of an infrared data port module of an exemplary module assembly for a zone controller.
Figure 17:
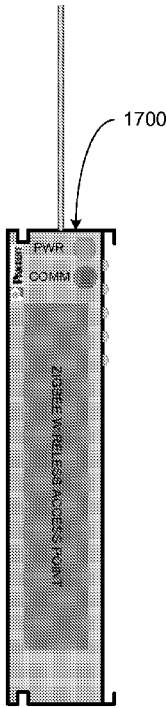
FIG. 17 is a front view of a wireless transceiver module of an exemplary module assembly for a zone controller.

An infrared data port (IRDA) module 1600 is shown in FIG. 16. The IRDA module 1600 allows for infrared connection of a laptop computer or pocket pc device for quick configuration. The IRDA module 1600 can also be incorporated for audio-visual control in auditoriums and conference rooms. FIG. 17 shows a transceiver module 1700 such as a radio transceiver module. In this example, radio transceiver module 1700 brings Zigbee (IEEE 802.15.4) wireless mesh networks into the zone controller, allows wireless field device data to be available to an IP network, and vice versa.

Figure 18:
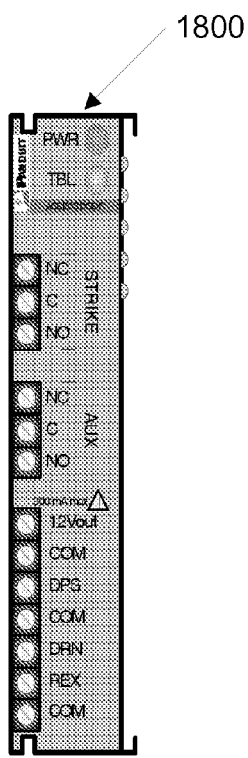
FIG. 18 is a front view of an access control door module of an exemplary module assembly for a zone controller.
Figure 19:
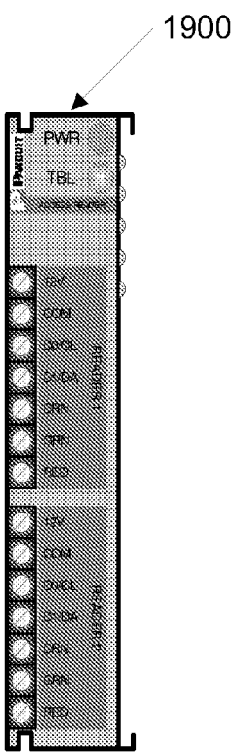
FIG. 19 is a front view of an access control reader module of an exemplary module assembly for a zone controller.

FIG. 18 shows an access control door module 1800 that is i/o capable of four state supervision. The access door module 1800 is used to monitor the request-to-exit device 150, FIG. 1, monitor the door contact 140, and to lock and unlock the door strike 110. An auxiliary contact is provided for doors requiring additional control functions like automatic openers and obstruction enunciators. A reader tied in to a zone controller 100 will have the ability to cause actuation of the strike (unlock) output on the access door module 1800, FIG. 18. All inputs on the module are supervised inputs. Additionally, in situations where an IP reader is used, the IP reader will have the ability to cause actuation of the door strike (unlock) output. An access control reader module 1900 is shown in FIG. 19. The access control reader module 1900 allows for access control of non-IP card readers using a Wiegand or ABA magnetic format. Up to two card readers can be connected to a single access control reader module 1900. Adding an access control door module 1800, FIG. 18, will enable full access control into an area. The access control reader module 1900, FIG. 19, connects to the processor module 1300, FIG. 13, using the i²C control bus. The processor module 1300 is capable of connecting multiple access control reader modules 1900, FIG. 19, into a single cohesive system. The configuration software allows a single card swipe to cause the unlocking of one or multiple doors. Additionally, readers can be configured for information only, and not for unlocking of doors.

Figure 20:
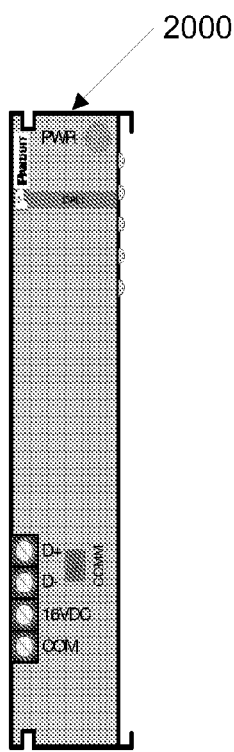
FIG. 20 is a front view of a lighting control module of an exemplary module assembly for a zone controller.
Figure 21:
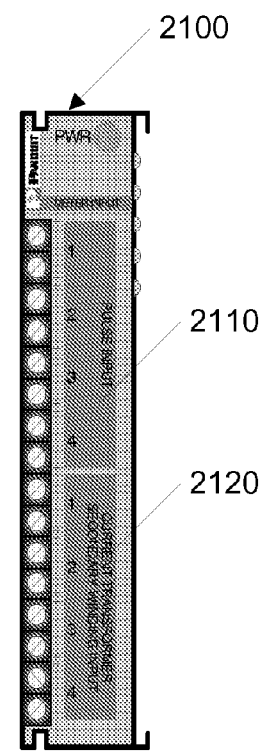
FIG. 21 is a front view of a utility meter module of an exemplary module assembly for a zone controller.
Figure 22:
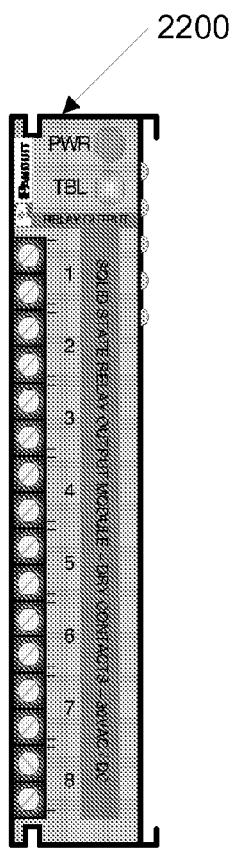
FIG. 22 is a front view of a solid state relay module of an exemplary module assembly for a zone controller.
Figure 23:
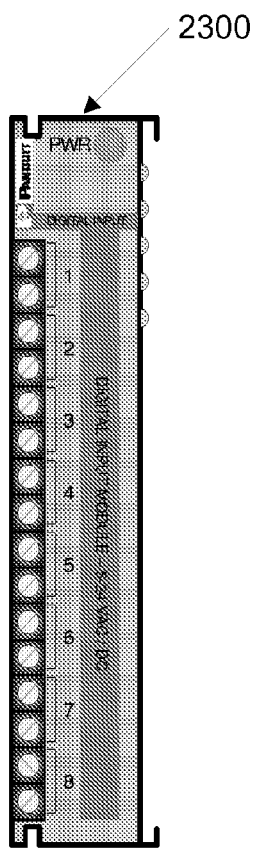
FIG. 23 is a front view of a digital input module of an exemplary module assembly for a zone controller.

FIG. 20, shows one example of a lighting control module 2000. In particular, a digital addressable lighting interface (DALI) control module is provided for addressable control of distributed DALI equipped lighting devices. A utility meter module 2100 is provided in FIG. 21 with pulse inputs 2110 and current transformer inputs 2120. Digital output module 2200 is shown in FIG. 22. The digital output module 2200 may be configurable as wet or dry contact solid state relay outputs, normally open or normally closed. The digital output module 2200 may be provided as a solid state relay module for control of door locks, HVAC mechanical systems, lights, irrigation systems, or any devices that accept switched signals or switched power. Each output of the digital output module 2200 is fully programmable from the processor module 1300, FIG. 13. Two switch options, Form A and Form C, may be provided at the module 2200 depending on the requirements of an application. Digital input module 2300 as seen in FIG. 23, provides HVAC digital input monitoring as well as supervised monitoring of security points. Each input is programmable from the processor module 1300, FIG. 13. Additionally, each input is capable of causing the main processor module to send an SNMP alarm to the network management software. The digital input module 2300 is preferably rated for 5-24VDC or 120-240 VAC. The digital input module contains a configurable internal pull-up current source to accept switched inputs without the need for additional power supplies, and to enable four-state supervision of field switches.

Figure 24:
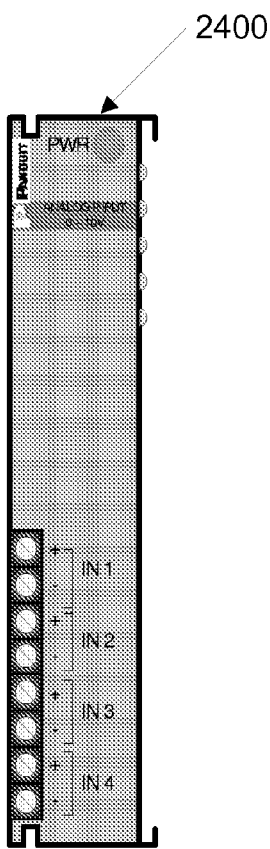
FIG. 24 is a front view of an analog input module of an exemplary module assembly for a zone controller.
Figure 25:
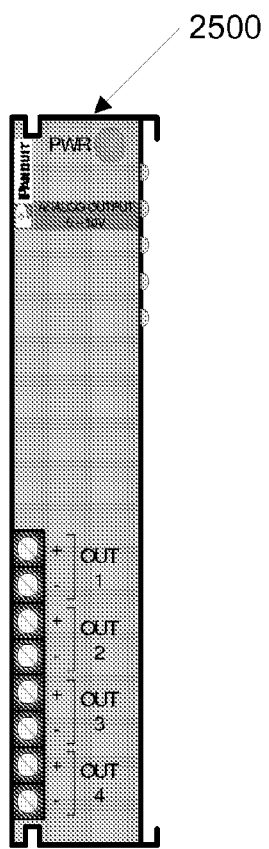
FIG. 25 is a front view of an analog output module of an exemplary module assembly for a zone controller.

Analog input module 2400, FIG. 24, provides monitoring of analog inputs. A printed circuit board for the analog input module 2400 has the capability of reading voltage, or amperage from a remote sensor. Additionally, software associated with the analog input module 2400 allows for logging of the analog values as well as generating SNMP alarms based on alarm limits. Each input is fully configurable from the processor module 1300, FIG. 13. Analog output module 2500, FIG. 25, allows for 0-10V or 4-20 ma analog control of variable frequency drives, actuators, valves for HVAC control, and analog dimmable lighting ballasts. Each output is fully configurable from the processor module 1300, FIG. 13.

Figure 26:
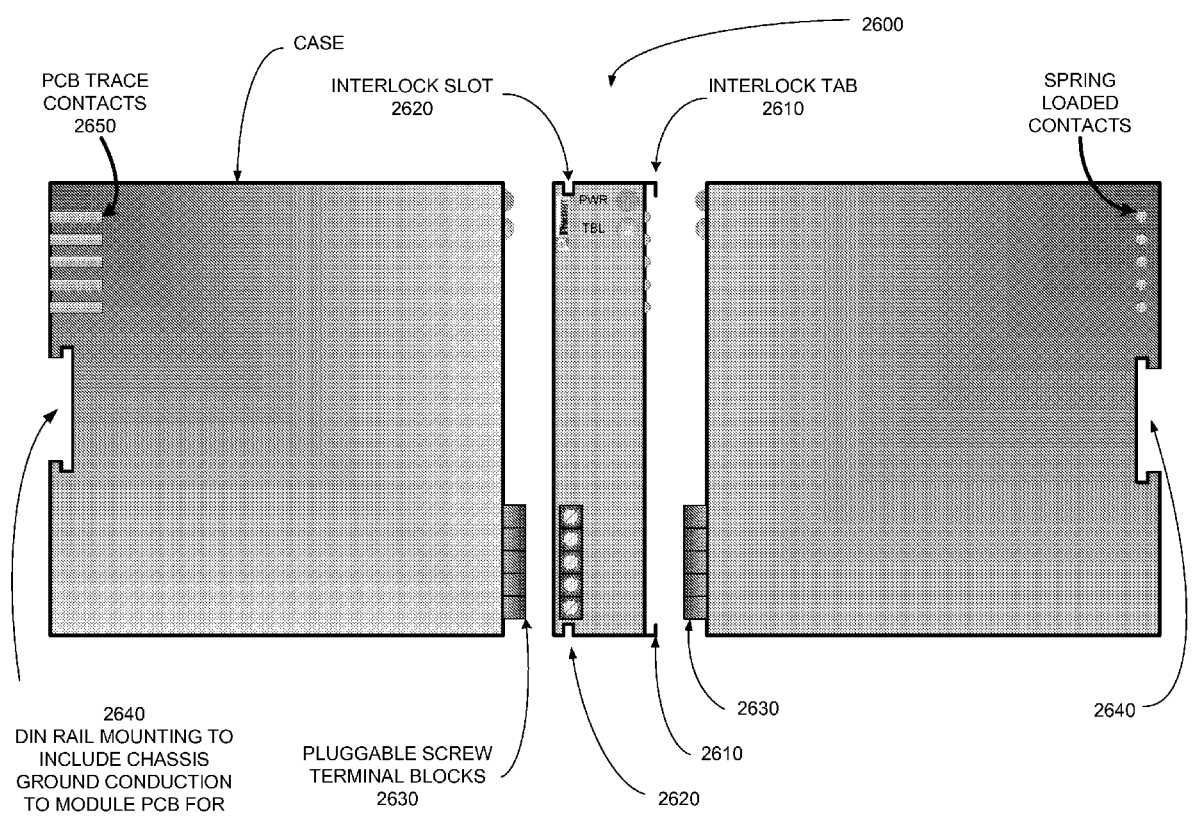
FIG. 26 is a partially-exploded view of a module assembly for a zone controller illustrating an example of module construction.
Figure 27:
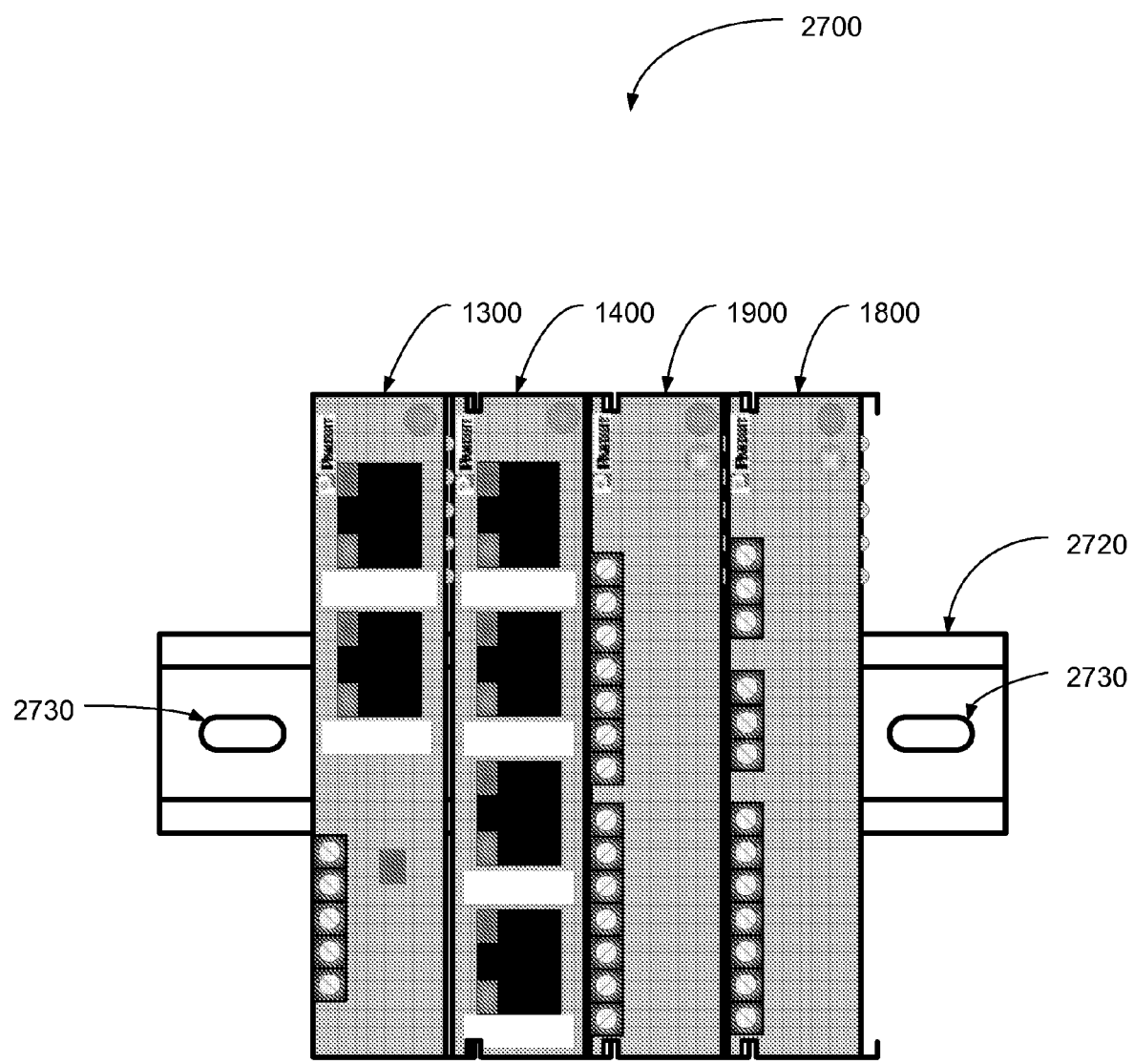
FIG. 27 is a front view of connected modules of an exemplary module assembly for a zone controller mounted on a DIN rail.

Referring to FIG. 26, a partially exploded view of an example module case 2600 is shown. The module case 2600 contains interlock tabs 2610 on the right side, and interlock slots 2620 on the left side. The module case 2600 has screw terminal blocks 2630 capable of removal from the modules without unscrewing the attached wires. This makes module replacement easy. The DIN (Deutsche Industrie-Norm) rail mounting approach allows removal of the module even with adjacent modules installed on both sides. The rail mounting notch 2640 contains a spring loaded contact for connection of chassis ground to the various module printed circuit boards (PCB). Chassis ground may be used to protect sensitive electronic components from static electricity discharge from service personnel.

The module design allows electrical and mechanical connection by sliding the various modules together as part of a system controller module assembly 2700 as illustrated in FIG. 27. The construction and design of the modules provide for various features. The modules may, for example, be formed from a dielectric material casing such as ABS. Holes, slots, or other openings in the casing provide access between modules for electrical connection. As seen in FIG. 26, the module case contains interlock tabs 2610 on the right side, and interlock slots 2620 on the left side to hold the modules together to engage the electrical contacts with sufficient force. The electrical contacts 2650 on the left module side can take the form of exposed, solder or gold plated PCB traces. This may reduce cost, compared to separate electrical contact parts for each side of the module. The processor module 1300, FIG. 13, preferably will occupy the leftmost position relative to the other modules, since the processor module is required for control operation and, in this example, lacks an engagement slot near its left edge. Any number of modules can physically engage together. The module construction, shown in the example of FIG. 26, is four inches tall, by four inches deep, by 0.8 inches wide. The modules may have differing width, height, and depth requirements; however, it is preferred that the interlocking features and electrical contact locations align.

FIG. 27 shows four modules connected and mounted on a DIN rail 2720 as part of the module assembly 2700 for a zone controller 100. The case retention tabs 2610 insert into the retention slots 2620 to align and attach the modules to each other. The DIN rail 2720, FIG. 27, is seen positioned in back of the modules, with mounting slots 2730, visible at the ends. As shown and described herein, the zone controllers may be housed as part of an adaptable module assembly with a main processor module. The zone controllers are provided with many characteristics for enhanced building automation control. The zone controllers are managed devices and may receive and forward power over Ethernet. The zone controllers may engage in peer-to-peer Ethernet communications. The zone controllers contain local intelligence for use at the system endpoints that includes a calendar, memorized event schedules, and timed control algorithms. Multiple Ethernet ports at the zone controllers provide for switching and connectivity of collocated Ethernet enabled equipment. An example of this includes providing the access control modules 1800 and 1900 with an Ethernet port to communicate upstream, plus at least one additional Ethernet port to communicate with an IP camera positioned, for example, proximate to a door of an area entrance. Power forwarding capability is provided with programmable voltage output. The capability for conversion of communication protocols is provided at the processor module. The controller assembly provides for discrete i/o. The zone controller functionality further provides the capability to be configured and commissioned by a system monitor or workstation from anywhere on a network.

Figure 28:
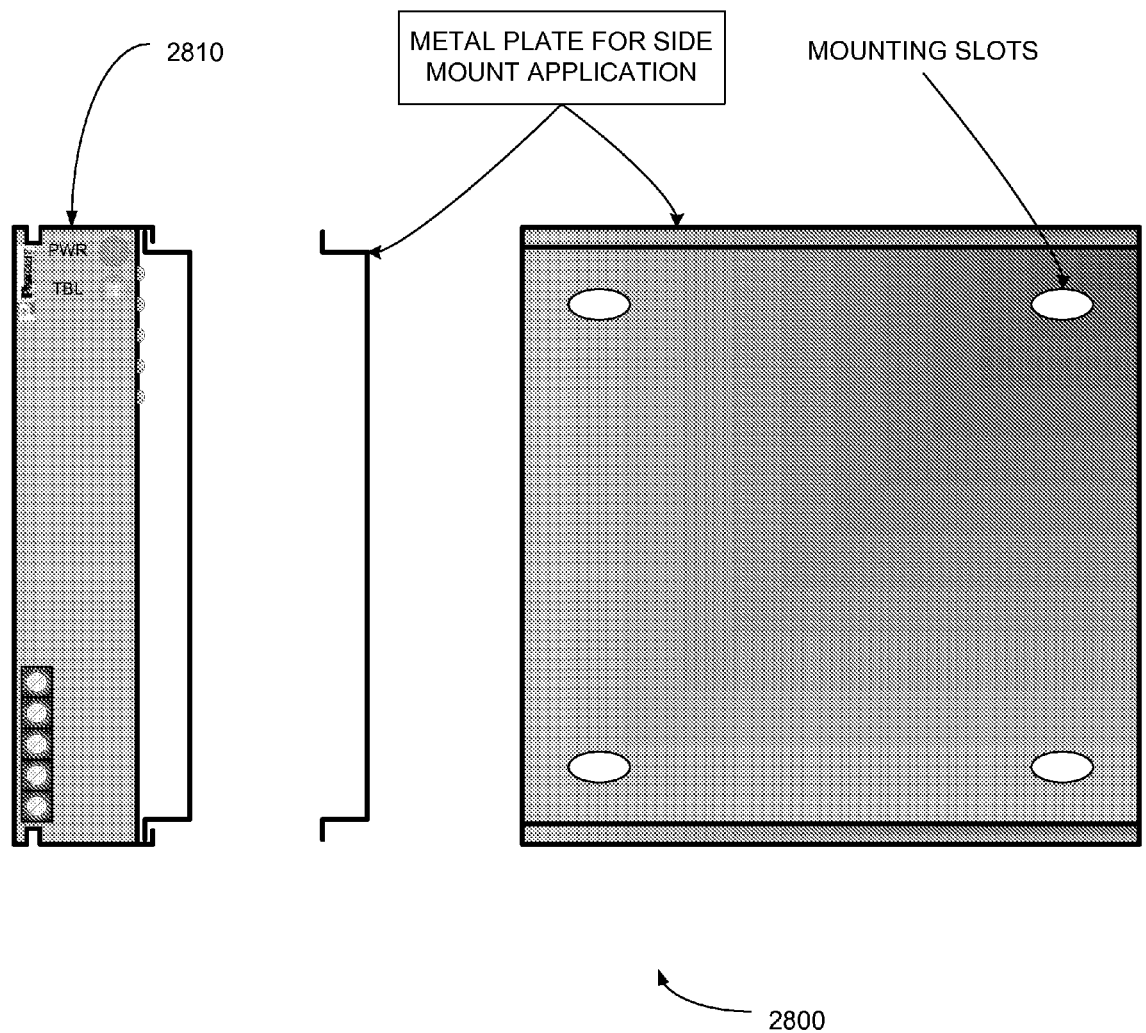
FIG. 28 illustrates the use of a side mounting plate.

Side mounting plate 2800 is shown in FIG. 28. The side mounting plate 2800 allows attaching the assembly, in a low profile manner, to a flat surface like an electrical enclosure, a wall, or a ceiling. For simplicity, one end module 2810 appears in FIG. 28, whereas at least one processor module 1300, FIG. 13, is also often provided in actual use.

Figure 29:
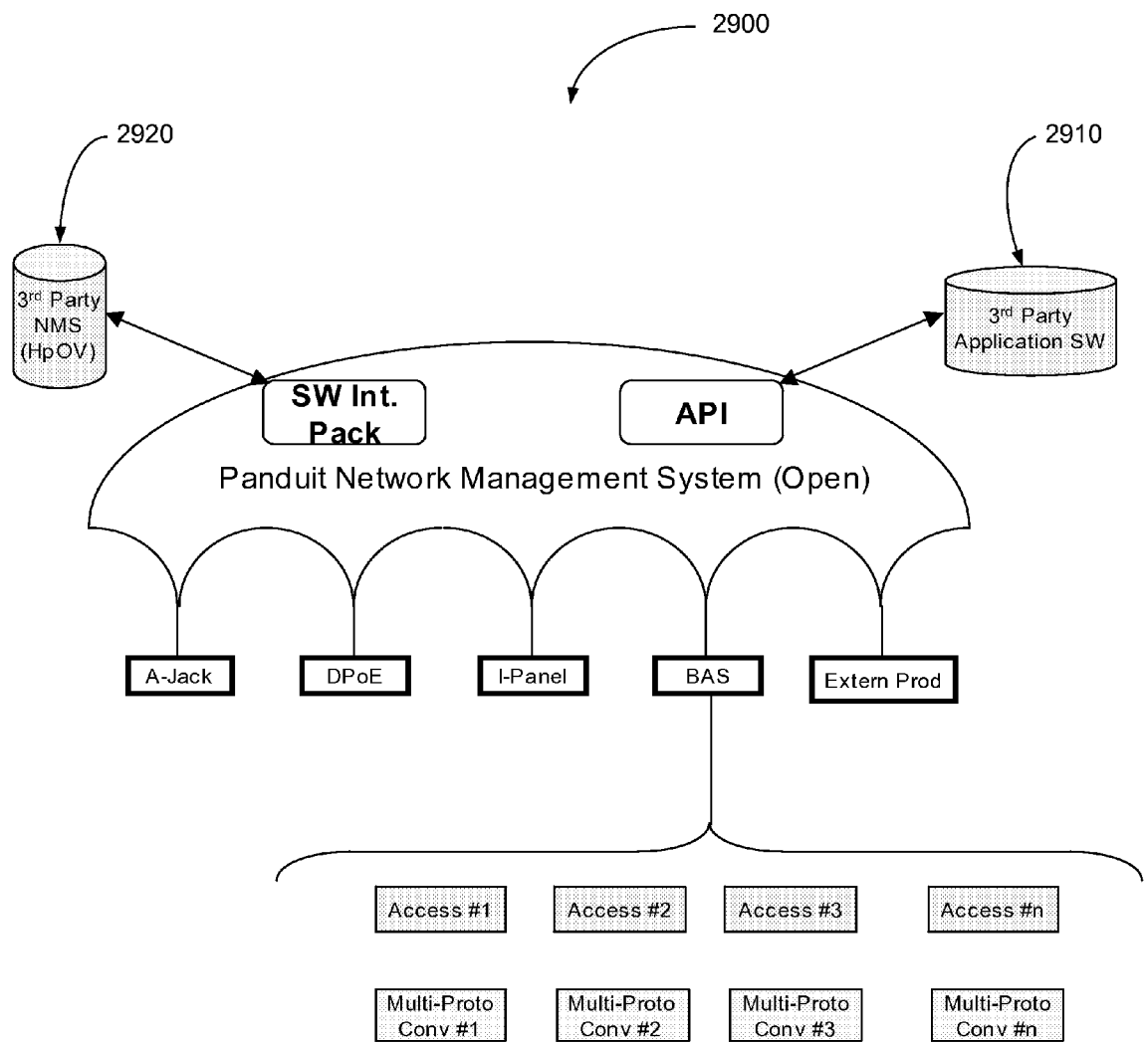
FIG. 29 is a system diagram of a network management system.

FIG. 29 is a system diagram of a network management system 2900. The network management system 2900 incorporates and manages active proprietary network equipment as well as vendor equipment. Network management system 2900 may, for example, be an Ethernet connected computer (or server) that performs maintenance and administration of networks. Network management is the execution of the set of functions required for controlling, planning, allocating, deploying, coordinating, and monitoring the resources of a network. Network management provides human access and visibility into the building control system. Network management system 2900 is open in that third-party application software 2910 can be integrated into the manager and the network management system can be integrated into third-party network management system software 2920. Specifically for the building control system, the network management system manages the zone controllers.

Figure 30:
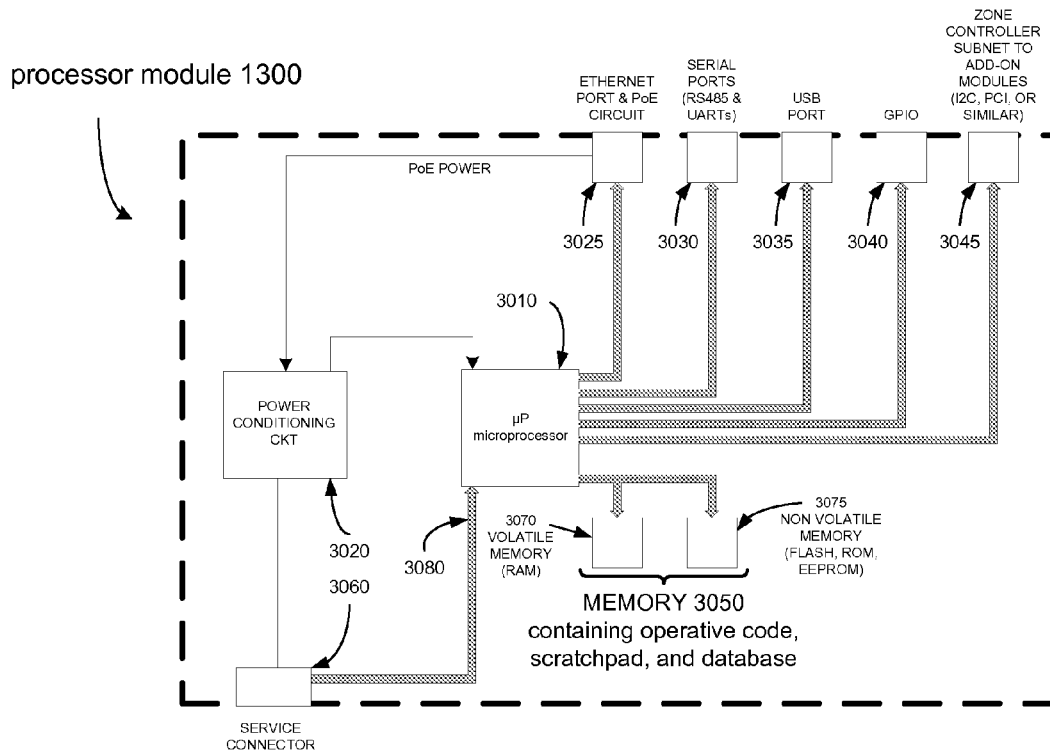
FIG. 30 is a block diagram depicting an exemplary processor module of the zone controller.

FIG. 30 provides a block diagram illustration of the processor module 1300, FIG. 13, of the zone controller 100. As seen in FIG. 30, processor module 1300 has a microprocessor 3010 connected to a variety of elements including a power conditioning circuit 3020, one or more Ethernet ports 3025, other serial ports 3030, a USB port 3035, general purpose inputs & outputs (GPIO) 3040, zone controller subnet 3045 for communication with additional zone controller modules, memory 3050, and service connector 3060. The power conditioning circuit 3020 derives operating power for the processor module 1300, and therefore the zone controller 100, from an Ethernet connection. This approach to powering of networked devices may be found in IEEE 802.3af. The memory 3050 has two main categories, volatile memory (RAM) 3070, and nonvolatile memory (FLASH, ROM, EEPROM) 3075. The nonvolatile memory 3075 contains information such as the executable code run by the microprocessor 3010, such as the application program and the operating system, both of which may be fetched by the microprocessor 3010 during power-up. The code information is then transported from the nonvolatile memory 3075 to the faster volatile memory (RAM) 3070, that is more suitable for running at the high microprocessor clock speeds. The nonvolatile memory 3075 also contains a database that contains point object configurations, personnel records, graphics files, memorized sequences of objects, and any other data to be maintained permanently, i.e. the information will be maintained even in the event of a power loss to the processor module 1300. The volatile memory 3070 contains registers that facilitate rapid execution of instructions, and that provides "scratchpad" space for evaluation of mathematical calculations, variable updates, and many other register manipulations well known to those in the art of computer science.

The service connector 3060 provides a means for entering information into the microprocessor 3010, which may also contain a limited amount of both volatile and nonvolatile memory. The service connector 3060 also can inject operating power, as represented by the path to the power conditioning circuit 3020. Information flowing to the microprocessor 3010 may also be stored in nonvolatile memory 3075. An example use of the service connector 3060 includes a software update to the database, the operating system code, or the application code. While information path 3080 is shown through the microprocessor 3010, then to memory 3050, a path may alternatively be provided directly to the memory, bypassing the microprocessor.

The microprocessor 3010 executes an application program that contains instructions defining how to service the various bidirectional information flowing through the Ethernet port 3025, serial port 3030, USB port 3035, GPIO port 3040, and subnet port 3045. These ports facilitate the normal operation of the processor module 1300 to interface with the outside Ethernet network. This includes the Ethernet network with connected equipment such as additional controllers, actuators, sensors, displays, and devices with a combination of these elements. As described, the ports also connect to other networks such as serial 3030, USB 3035, and the zone controller sub-network 3045. Various zone controller add-on modules may, in turn, wire to sensors, actuators, displays, or combinational devices. These ports allow the communication of information, by means of various protocols or signals, to affect measurement and control of a building environmental parameter, such as temperature, humidity, light level, air quality, energy usage rate, smoke level, or physical access.

Figure 31:
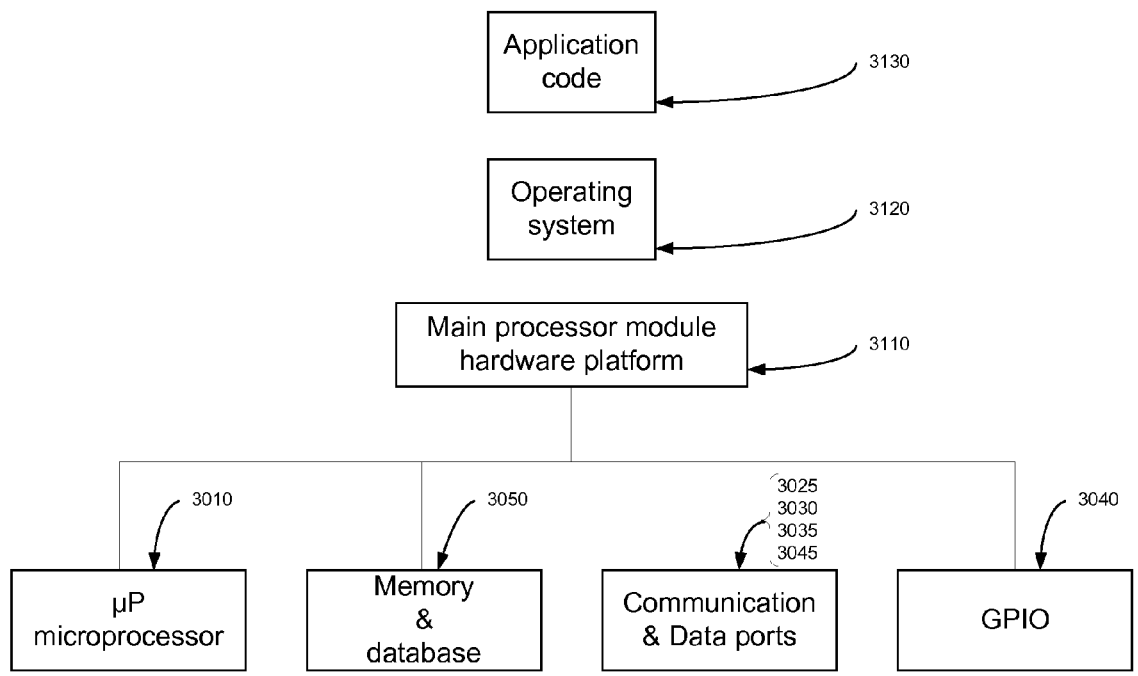
FIG. 31 illustrates an example of operational hierarchy for the processor module of the zone controller.

FIG. 31 illustrates an example of the operational hierarchy of the processor module 1300 operation. From the bottom up, it illustrates the various hardware elements such as the microprocessor 3010, memory and database 3050, communication and data ports 3025, 3030, 3035, and GPIO 3040 constituting a hardware platform 3110. The operating system 3120, such as WindowsCE.net, then runs upon the hardware platform 3110, much like simplified PC (Personal Computer) architecture. Specific application programs 3130, such as database management, Visual Basic, text editors, web servers, and other programs, allow a programmer to intervene into the zone controller 100 to provide any arbitrary, logical building control algorithm desired. A further degree and nature of control may also be provided by each of the various add-on modules of the zone controller 100.

The invention claimed is:

1. A method of event management in a building control system having multiple building control subsystems each including a plurality of devices, the building control system comprising a zone controller operating as a local area controller, the method comprising the zone controller:
    collecting data from the subsystems;
    storing the collected data;
    analyzing the stored data to determine patterns of behavior in a building and to generate customized reports based on sequences of related events;
    grouping software objects from the building control system into subsets, the grouping triggered by a predetermined criterion or a logically tested set of occurrences;
    indexing the subsets based on at least one of: relevance, relationship, or causal relationship to form indexed subsets;
    assigning a name, label, identification number, address, or equivalent for the indexed subsets to form a grouped object sequence; and
    storing the grouped object sequence, wherein the building control system comprises a plurality of point objects, the grouping of software objects comprising associating each point object with an area object, a system object, a controller object, and a subsystem object, the point objects able to undergo logical association with more than one area object, more than one system object, more than one controller object, and more than one subsystem object.

2. The method of claim 1, further comprising monitoring a plurality of zone controllers using a network management system connected to the zone controllers via a common communication network.

3. The method of claim 1, further comprising supplying power to the zone controller via a Power Over Ethernet (PoE) connection.

4. The method of claim 1, wherein collecting the data comprises reading in software objects sent via different protocols from devices in the subsystems.

5. The method of claim 1, further comprising executing a control action sequence in response to the predetermined criterion or the logically tested set of occurrences, the control action sequence comprising a predetermined sequence of control actions each of which affects a state of one of the devices.

6. The method of claim 1, wherein the building control system comprises an access control subsystem having access control devices associated with different doors in the building and a non-access control subsystem having non-access control devices, the method comprising at least one of:
  affecting a state of an access control device associated with a first door when a state of an access control device associated with a second door is changed;
  affecting a state of a non-access control device associated at least one physical area adjacent to at least one of the first or second doors when the state of the access control device associated with the second door is changed; or
  affecting a state of a non-access control device associated with multiple physical areas when the state of the access control device associated with at least one of the first or second doors is changed.

7. The method of claim 1, wherein collecting the data comprises receiving signals from sensors and actuators coupled with i/o modules of the zone controller, the method further comprising controlling a building environmental parameter in response to the signals, the building environmental parameter including at least one of: temperature, humidity, light level, air quality, energy usage rate, smoke level, or physical access.

8. The method of claim 1, further comprising providing web-based tools to allow interaction between the building control system and a user.

* * * * *